UNITED STATES PATENT OFFICE.

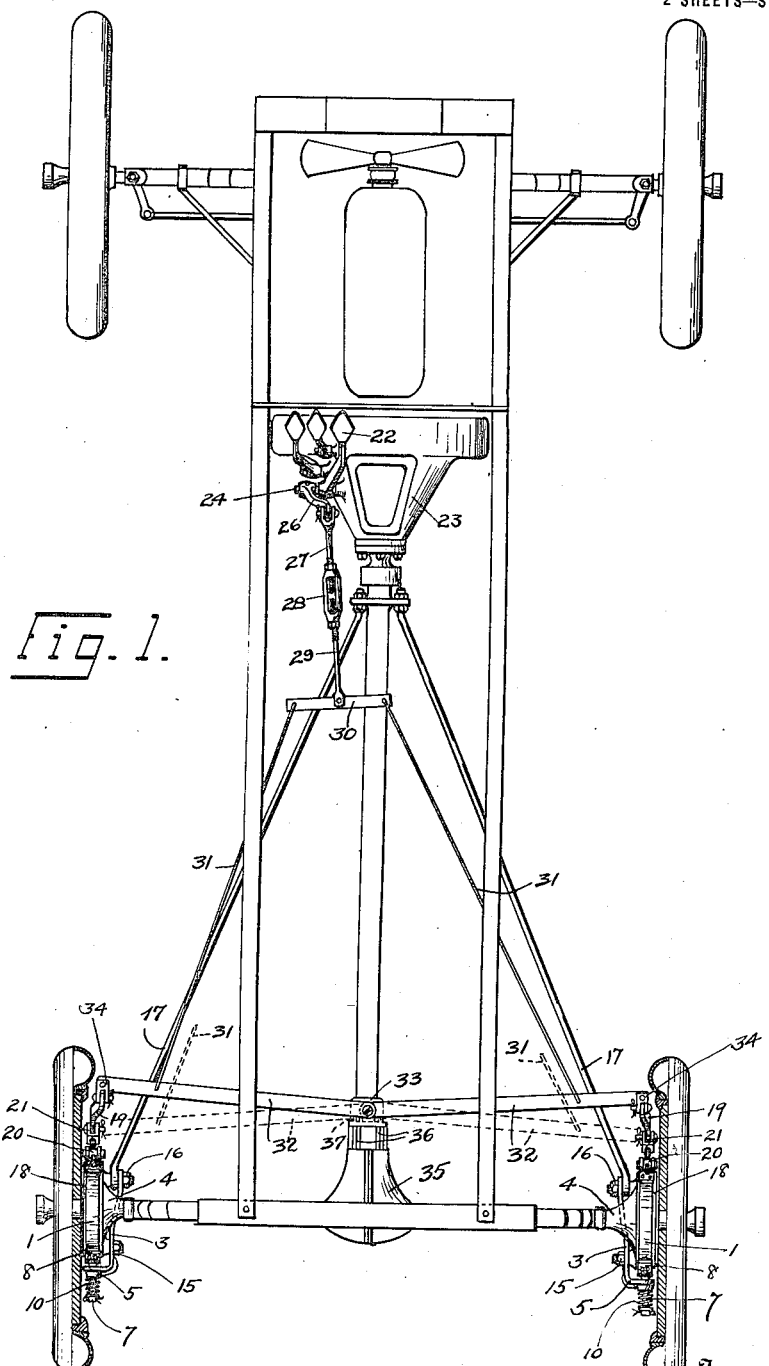

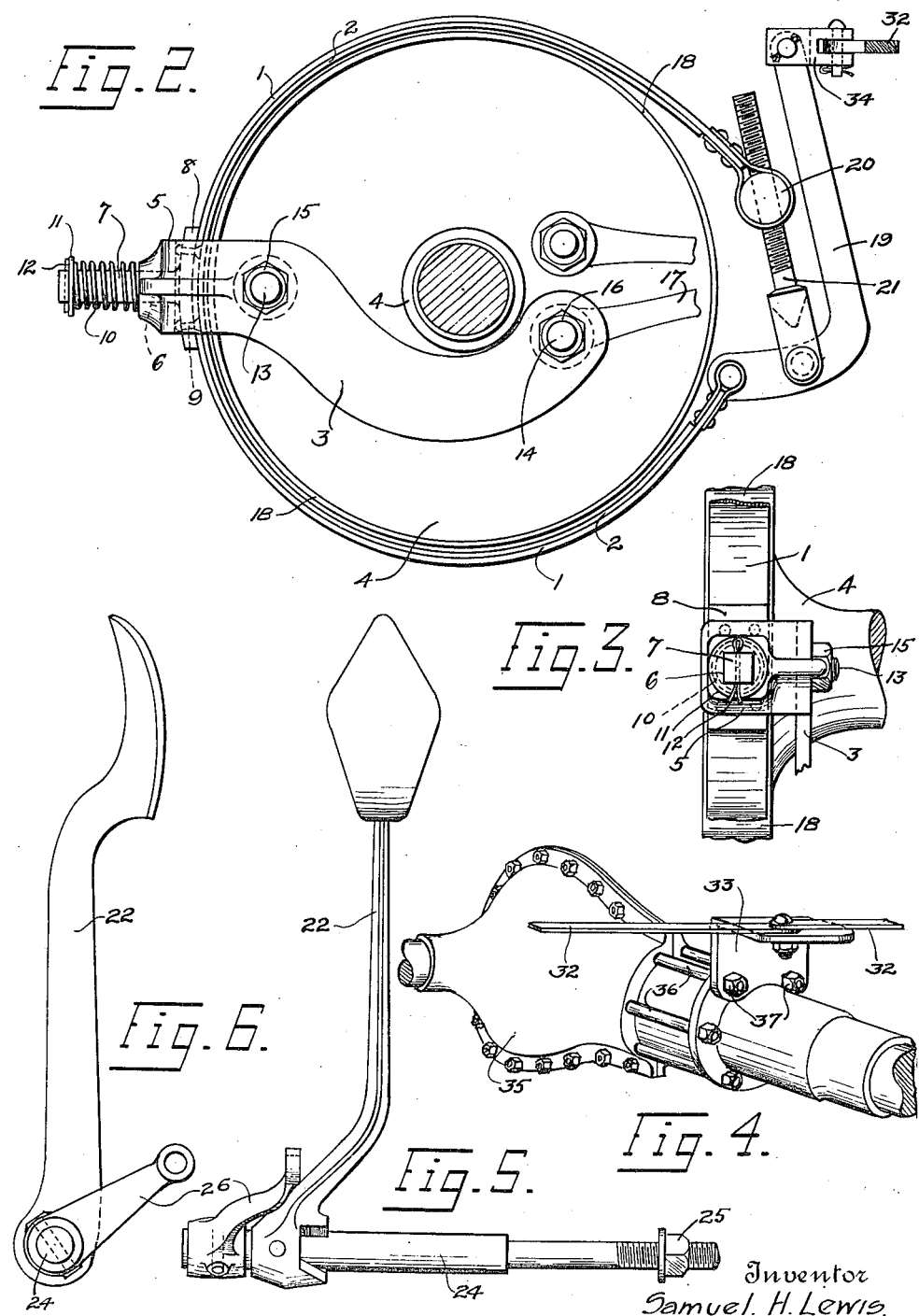

SAMUEL H. LEWIS, OF NEW YORK, N. Y.

BRAKE FOR MOTOR-DRIVEN VEHICLES.

1,353,806.  Specification of Letters Patent.  Patented Sept. 21, 1920.

Application filed February 20, 1918. Serial No. 218,194.

*To all whom it may concern:*

Be it known that I, SAMUEL HAZZARD LEWIS, a subject of the King of Great Britain and Ireland, residing at 20 West 60th street, New York city, in the county of New York and State of New York, have invented certain new and useful Improvements in Brakes for Motor-Driven Vehicles, of which the following is a specification.

This invention relates to brakes for automobiles and other motor-driven vehicles.

Among the objects of the invention are to provide a brake having greatly increased braking power in comparison with existing brakes of the same size and braking surface; to provide a brake which may be applied to an automobile or motor vehicle by the use of existing bolting appliances and without modification or rearrangement of the parts of the vehicle; to provide a brake operating directly on the vehicle wheels and in which the braking force is applied equally to both wheels; to provide a brake supported entirely by and movable in its entirety with the rear axle housing of the vehicle; and to provide a brake in which the entire length of the brake band is brought into action at each application of the brake.

With these and other objects in view, the invention consists in the constructions, arrangements and combinations of parts hereinafter referred to in detail and pointed out in the appended claims.

The accompanying drawings illustrate in detail the construction of one form of braking mechanism in accordance with the invention, and also show the application of said mechanism to an automobile.

In these drawings:—

Figure 1 is a diagrammatic plan view of an automobile having the braking mechanism applied thereto, Fig. 2 is a side elevational view of the brake drum, the brake band and its supporting bracket, and part of the operating means therefor, Fig. 3 is a detail rear elevation showing certain of the parts illustrated in Fig. 2, Fig. 4 is a view of the differential housing illustrating a supporting bracket mounted thereon and actuating levers pivoted on said bracket, Fig. 5 is a rear view of the brake lever, and bell crank thereof, and Fig. 6 is a side view of said lever and bell crank.

It may here be stated that the brake forming the subject matter of the present invention is particularly applicable to automobiles of the well-known "Ford" type, and in the drawings above referred to the brake has been illustrated for use with and as applied to a Ford automobile. It is of course to be understood that the invention is not in any sense restricted to cars of this particular type, as by making minor modifications in the design and arrangement of the parts the brake may be applied to other types and makes of motor vehicles.

Referring particularly to Figs. 2 and 3, it will be seen that the brake band 1 having brake lining 2 is carried by a bracket 3. In the particular form of this bracket illustrated in the figures, it comprises the body portion 3 suitably curved to accommodate the wheel housing flange 4 and a bearing portion 5 bent at substantially right angles to the body portion and provided with a hole 6 of square cross-section. In this hole is slidably mounted a square rod 7 having a flanged head 8 at its inner end, to which the brake band 1 is secured by rivets or other devices 9. The band 1 is secured to the head 8 at substantially the central point of its length, and the head 8 and rod 7, working in the bearing portion of the bracket constitute the sole support of the brake band. A spring 10 surrounding the rod 7 tends to return the band 1 to the inoperative position illustrated in Fig. 2, and to normally hold the band in this position, the spring abutting at one end against the bearing portion 5 and at the other end against a washer 11 held on the rod 7 by a pin 12.

In automobiles and motor vehicles of the "Ford" and similar types, the wheel housing flange 4 has two bolts 13 and 14 projecting therefrom, and provided with nuts 15 and 16 respectively, the bolt 13 being associated with the internal expanding brake mechanism within the housing, and the bolt 14 supporting the rear end of the radius rod 17 which is held on the bolt by the nut 16. According to the present invention these two bolts are utilized to secure the bracket 3 firmly to the wheel housing flange, the body portion 3 of the bracket having holes suitably located therein to fit over said bolts and being held thereon by the existing nuts 15 and 16. The brake drum 18 in the aforesaid type of vehicle, is carried by the wheel of the vehicle, and the bracket 3 is of such form that the brake band carried thereby may properly coöperate with the exterior surface of said brake drum. By thus arranging the brake band to coöperate with the exterior surface of the brake drum, it is possible to use a brake lining composed of part webbing and part metal, without danger of metallic particles being carried by the lubricating oil to the bearings of the vehicle. By the use of such a brake lining a better gripping action between the band and drum is obtainable and chattering of the brake parts is entirely prevented. Also by direct action of the brakes on the wheels of the vehicle the tendency to skid or slip on application of the brakes is overcome.

It will be noticed that the bracket 3 is secured directly to the wheel housing flange solely by the use of existing bolting devices and without the necessity for providing other special brackets or supports or other parts. Thus the bracket and the brake band carried thereby may be applied with the greatest ease and quickness to the wheel housing of an existing automobile or vehicle of the type mentioned without any alteration or adjustment thereof, and will be in position to coöperate with the brake drum carried by the wheel of such vehicle.

Secured to one end of the brake band 1 is a bent actuating lever 19, and the other end of said band carries a block 20 having a screw-threaded aperture in which is threaded a rod 21 forked at its lower end and connected to the lever 19 intermediate the ends thereof. By reason of the special manner of mounting the brake band as hereinbefore described, it will be seen that when the bent actuating lever 19 is operated, as by the means hereinafter referred to, the entire band 1 moves forwardly until the rearmost portion thereof, that is, the portion secured to the flanged head 8, contacts with the brake drum, and then by the drawing of the ends of the band, together, the two halves of the band are drawn into close contact with the peripheral surface of the drum, the two halves of the band as it were hinging about the rear connection thereof with the head 8 until they contact with the drum surface. It will be noticed that with this method of supporting the brake band the entire surface of the band is caused to contact with and grip the brake drum, in contradistinction to existing braking devices in which a portion only, and in some cases a minor portion, of the band actually grips the drum surface. Thus a considerably greater braking force is produced by the use of the brake mechanism herein described. The forward movement of the band 1 and head 8 causes the rod 7 to slide in the bearing portion 5 against the action of the spring 10, and this spring tends to return the rod, head and hand to inoperative position when the force applied to the lever 19 is released.

The rod 7 working in the squared aperture of the bearing portion 5 serves not only to guide the band in its movements to and from the brake drum, but serves to balance the band or hold it centrally with respect to said drum, so that it is spaced from the surface of the drum substantially the same distance throughout its entire length. The rod also serves to prevent canting of the band or movement of the same about the axis of the rod thus the band will always grip the surface of the drum properly over its entire surface.

It will of course be understood that the parts hereinbefore mentioned are provided for each rear wheel of the vehicle, as will be clear from an inspection of Fig. 1, and in accordance with further features of the invention, the two brake bands are connected to a single operating member, or brake pedal, located adjacent the driver's seat, through connections which cause an equal distribution of the force applied to said pedal, to the two bands, and cause said forces to be applied directly to the bands.

In automobiles and vehicles of the "Ford" and similar types, the brake pedal 22 is mounted as shown in Fig. 1 upon the transmission casing 23, the pedal being secured to a spindle 24 mounted in a suitable bearing and secured in place by nut 25, the spindle being connected to the existing brake mechanism in a manner which it is not necessary to illustrate or describe herein. This spindle 24 usually terminates substantially flush with the outer surface of the pedal. In accordance with the present invention, when the brake is applied to an existing vehicle of the type mentioned, the existing brake pedal 22 is employed but a substitute spindle 24 is provided, the outer end of which extends sufficiently beyond the outer face of the pedal to receive a crank arm 26, which is firmly secured to the spindle and extends at an angle rearwardly from the pedal as shown in Fig. 6. By thus utilizing the existing brake pedal and a substitute spindle with crank arm thereon, the location and mounting of the brake pedal are the same and separate bearing or brackets therefor and alteration or readjustment of the transmission casing and adjacent parts is entirely avoided. The substitute spindle is merely secured to the brake pedal in place of the existing spindle without any other modification of the vehicle, and the crank arm 26 is properly positioned for connection with the brake bands without cutting or alteration of the floor board of the vehicle.

The crank arm 26 is connected to a rod 27, connected by an adjustable turn buckle 28 with a second rod 29, the latter in turn being connected to an equalizing bar 30. The ends of the bar 30 are respectively connected by means of rods, cables or the like 31 with two levers 32 which are pivoted at their inner ends upon a bracket 33 and are connected at their outer ends to the bent actuating levers 19. The connection of the levers 32 and 19 is effected by short links 34 pivotally connected to the levers 32 for movement in a horizontal plane, and pivotally connected to the levers 19 for movement in a vertical plane, thus establishing a double pivotal connection between the levers.

It will be clear that pressure applied to the pedal 22 is transmitted by the crank arm 26, rods 27, 29, bar 30 and cables 31 to the levers 32, and that these levers are moved about their pivots and thus operate the bent levers 19, the latter in turn actuating the brake bands in the manner already described. By the use of the bar 30 and connections 31, the pressure on the pedal is transmitted equally to the two levers 32, that is, if one band should contact with its drum slightly before the other, the movement of the corresponding lever 32 and cable 31 will be arrested and the bar 30 will in effect pivot about the forward end of the cable 31 to permit the pressure to be transmitted to the other band by the other cable 31 and lever 32. Thus both bands will be firmly applied with equal pressure to the vehicle wheels, and any tendency of the vehicle to skid or slip in consequence of unequal brake application is entirely avoided.

For convenience of illustration the levers 32 are shown in the applied position in Fig. 1, the released position being indicated by dotted lines. These levers it will be noted constitute a means whereby a direct pull may be applied to the brake band or a pair of the same from an offset member such as the pedal 22. The levers 32 are arranged so that the outer ends thereof move substantially in the planes of the brake bands as indicated in Fig. 1, so that a substantially straight direct pull is applied to each of the levers 19 and canting movement of the bands such as would unduly strain the rod 7 is prevented. Furthermore the pressure is applied by the lever with considerably greater effectiveness to the brake band due to this straight direct application of such pressure. The double pivotal connection afforded by the links 34 permits the necessary relative arcual movement between the ends of the levers 32 and 19.

The differential housing employed in vehicles of the type hereinbefore mentioned is illustrated to such an extent as is necessary in Fig. 4 of the drawings, and it will be noted that this casing 35 is provided with bolts 36. The bracket 33 on which the levers 32 are pivoted is secured to the transmission casing by the uppermost two of the bolts 36, the bracket having holes so located that by merely removing the two nuts 37 of these bolts the bracket may be positioned on the bolts and firmly held in place by said nuts. Thus the levers are supported without the necessity for providing special or additional securing means, and without any alteration or re-arrangement of the parts of the vehicle.

It will be noticed that the brake bands are mounted upon the wheel housing flanges and the operating mechanism therefor is mounted upon the differential housing which is secured to the rear axle housing.

Thus the entire mechanism is in effect carried by the rear-axle housing and consequently there can be no displacement of any part of the brake mechanism relatively to any other part thereof due to shocks received from irregular road surfaces, such as may occur where parts of the brake mechanism are carried by the vehicle frame and other parts on the rear axle. Thus there can be no releasing of the brake pressure due to such relative movement, but the braking force is applied constantly irrespective of the road surface over which the vehicle is moving, and chattering and excessive wear of the brake parts is avoided.

The brackets 3 do not interfere with shock absorbers, or other attachments which may be mounted at the rear part of the vehicle, as they fit closely to the wheel housings. Where side spring attachments are provided, the brackets supporting the side spring may be secured to the bolts 13 and 14, in which case the bearing portions 5 are made somewhat longer to compensate for the thickness of these brackets.

The construction and arrangement of the parts of the improved brake mechanism have been described in full detail so that the same and their operation will be clearly understood. It is to be borne in mind however that the invention is not restricted to the aforesaid details of construction and arrangement, as obviously the same may be modified as found necessary or desirable. Also as previously indicated the invention in certain of its aspects is not restricted to its use with motor vehicles of the particular type hereinbefore referred to.

What I desire to secure by Letters Patent is:—

1. Brake mechanism comprising in combination a pair of rotatable brake drums having their axes substantially in alinement, a pair of brake bands surrounding the same, means for supporting said bands, operating means connected to the ends of each of said bands, a pair of levers connected at their outer ends to said operating means, said levers extending toward each other and being pivoted at their inner ends, and means for moving said levers about their pivots to actuate said operating means.

2. Brake mechanism as claimed in claim 1, wherein said operating means include a pair of levers, connected to the first named levers by connecting members pivotally connected to both levers by pivots having their axes substantially at right angles to each other.

3. Brake mechanism for motor vehicles, comprising in combination, a pair of brake drums connected to the rear vehicle wheels, a pair of brake bands surrounding said drums, means for supporting said bands secured to the axle housings, operating means connected to the ends of said bands, a pair of levers pivotally connected at their inner ends to the rear axle housing centrally between said bands, said levers being connected at their outer ends to said operating means, and means for moving said levers about their pivots to actuate said operating means.

4. Brake mechanism for motor vehicles as claimed in claim 3, wherein the levers are pivotally mounted on a bracket secured to the differential housing connected to the rear axle housing.

5. In a motor vehicle, the combination with the transmission gear casing, differential gear housing, brake drums secured to the rear wheels, and rear axle housings, of a spindle mounted on said casing, a brake pedal and crank arm secured to said spindle, an equalizing bar, a connection between said arm and said bar intermediate the ends thereof, a bracket on the differential housing, levers pivoted on said bracket and extending outwardly therefrom, brake bands surrounding said brake drums, means connecting the outer ends of said levers to said bands, connections between the outer ends of said equalizing bar and said levers intermediate the ends of the latter, and means secured to said axle housings and supporting said bands.

6. In a motor vehicle, the combination with a vehicle wheel, a brake drum secured thereto, and a rear axle housing having a flange adjacent said wheel, of a bracket having a portion bolted to said rear axle flange at the rear of the wheel axis and curved downwardly and forwardly beneath said housing and bolted thereto forwardly of the wheel axis, said bracket also having a portion extending at right angles from the first portion at the rear of the brake drum and provided with an angular bearing, a brake band surrounding said brake drum, and an angular member carried by said brake band and slidable in said bearing.

7. Brake mechanism for motor vehicles, comprising brake drums connected to the vehicle wheels, brake bands surrounding said drums, means for supporting said bands, and means for operating said bands including an operating member, an equalizing bar to which said operating member is connected intermediate the ends of the bar, a pair of levers having their outer ends connected to the brake bands and their adjacent inner ends pivoted to a support, and connections between the ends of the equalizing bar and said levers for moving the latter to operate the bands.

8. Brake mechanism as claimed in claim 7, wherein the operating means includes a spindle, means for supporting the same, a brake pedal and crank arm secured to said spindle and a connection extending between said crank arm and the equalizing bar intermediate the ends of the latter.

9. Brake mechanism comprising in combination a rotatable brake drum, a brake band surrounding the same, means for supporting said brake band, a lever extending transversely of the plane of the brake band and pivoted at one end at a point distant from said plane and having its other end movable substantially in a plane parallel with that of the brake band, operating means for the brake band connected with the last mentioned end of said lever and operating means for said lever connected thereto at a point adjacent the last mentioned end thereof.

In testimony whereof I affix my signature in presence of two witnesses.

SAMUEL H. LEWIS.

Witnesses:
Wm. C. St. Clair,
Charles Bunham.